June 1, 1965  F. HAYUNGA  3,186,465

BOLT RETAINING DEVICE

Filed March 26, 1962

INVENTOR
FRED HAYUNGA

BY

ATTORNEYS.

United States Patent Office 3,186,465
Patented June 1, 1965

3,186,465
BOLT RETAINING DEVICE
Fred Hayunga, 234 Godwin Ave., Wyckoff, N.J.
Filed Mar. 26, 1962, Ser. No. 182,322
1 Claim. (Cl. 151—41.71)

This invention relates in general to retention devices for bolts and similar connecting elements, and in particular to a new and useful bolt retention ring construction with retention cage elements for holding bolt elements on an apparatus such as an aircraft wheel.

The present invention has particular application for use in connection with vehicle wheels such as an aircraft wheel, in which bolt elements are employed to secure hub portions to the tire elements and in which at least one side of the bolts is enclosed by a cover or hub cap element. Prior to the present invention it was usual to secure the hub disk elements of a wheel together by bolt fasteners without providing any means for retaining the bolt elements in association with the wheel, should one or more of the nuts or the bolt element itself break.

This was particularly advantageous in the case of an aircraft wheel construction where the wheels move at high rotational speed during landings and take-off. In such cases it was not unusual for the bolt which has broken to fall into an annular space surrounding the axle and cause a great deal of damage to the axle as well as to the brake drum elements which are arranged at the periphery of one of the hub disks.

Attempts have been made to provide individual securing elements for each of the bolts in a hub disk, but a disadvantage of such construction is that they were apt to cause unbalancing of a wheel and were apt to become displaced from the center of rotation of the wheel, so that they cause misalignment and perhaps wheel failure.

In accordance with the present invention there is provided an improved bolt retaining ring construction which includes a plurality of openings for bolt members aligned with similar openings formed on the disk of a wheel structure and which further includes retaining cage elements which are formed surrounding the openings in a position to permit them to encircle a major portion of a bolt head element.

In a preferred arrangement the cage elements are formed by opposing substantially U-shaped bracket members which are welded directly to the ring and which include inturned side flanges arranged to receive a U-shaped channel member which is bolted to the top flanges of the U-shaped elements after the bolt is positioned through the respective openings in the ring. An advantage of the construction is that the channel members may be easily welded in position adjacent the openings and a securing channel or cage element is provided which fits downwardly into the channel in a retaining manner to completely enclose the head of a bolt element. The opposing channel members are advantageously provided with threaded openings to receive bolts for holding the cap member in position over the head of the nut which is retained therein. The retaining means thus provided are easy to manufacture as a complete element which may be rapidly assembled over a wheel disk to be secured thereon by bolts which are positioned through the openings thereof.

Accordingly, it is an object of this invention to provide improved retaining means for bolts and similar elements.

A further object of this invention is to provide a retaining ring for a wheel structure with a plurality of openings adapted to align with the openings in a wheel disk with bolt retaining cages constructed adjacent each of the openings which include a removable cap member to permit insertion of the bolts.

A further object of the invention is to provide a retaining member for bolts and similar elements which includes a plate having an opening therein and opposed channel members positioned on each side of the opening, the channel members including inturned flanges to receive a top cap member which is bolted directly to the top flanges of the channel member.

A further object of the invention is to provide retaining means for bolts and similar securing elements which is simple in design, rugged in construction and economical to manufacture.

The various features of novelty which characterize the invention are pointed out with particularity in the claim annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
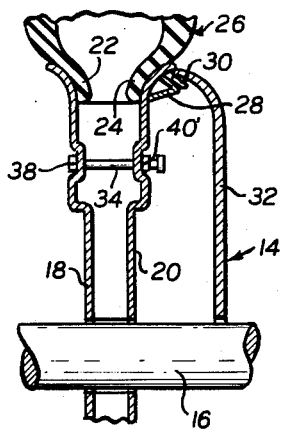
FIG. 1 is a fragmentary, transverse section of an aircraft wheel having a bolt retaining ring constructed in accordance with the invention.

Referring to the drawings in particular, the invention embodied therein includes retaining means generally designated 10 provided on a novel retaining ring 12 which is particularly adapted for use with an aircraft wheel assembly generally designated 14. As indicated in FIG. 1, the aircraft wheel assembly is indicated on an axle 16 of an aircraft and it comprises wheel disk elements 18 and 20 which are bolted together around each side of the annular inturned flange portions 22 and 24 of a tire generally designated 26. In this type of aircraft wheel it is usual that the disk 20 carry annular brake elements 28 which are contacted by adjustable brake means 30 carried in a hub cap element 32. The disks 18 and 20 are held together by a plurality of angularly spaced bolt elements 34, the shank of which is positioned through openings 36 on the retaining ring 12 and corresponding openings on the disks 18 and 20 and secured by nut 38 on the opposite side. A head 40' of the bolt is positioned between the hub cap 32 and the disk 20, and in accordance with the invention means are provided to insure that the cap 40' or the bolt 34 does not fall out of its position in the disk 20 and into the space between the disk 20 and the hub cap 32.

In accordance with the invention the retaining ring 12 includes a number of openings 36 corresponding to the number of openings in the wheel disks 18 and 20. The retaining means 10 are arranged around each of the openings and it advantageously comprises proposed pairs of channel-shaped elements 40 and 42 which include a low widened flange portion 44 which is secured directly to the ring 12 such as by tack welding and an upper flange portion or base 46. In addition, the channel members 40 and 42 are provided with a center web 48 having inturned ends 50 and 52 which are disposed on each side of the head 40' of the bolt 34 and provide retaining means for a cap element generally designated 54.

Figure 2:
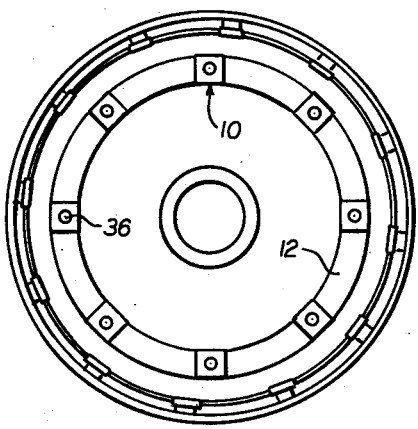
FIG. 2 is a side elevation of an aircraft wheel disk with a retaining ring thereon constructed in accordance with the invention.
Figure 3:
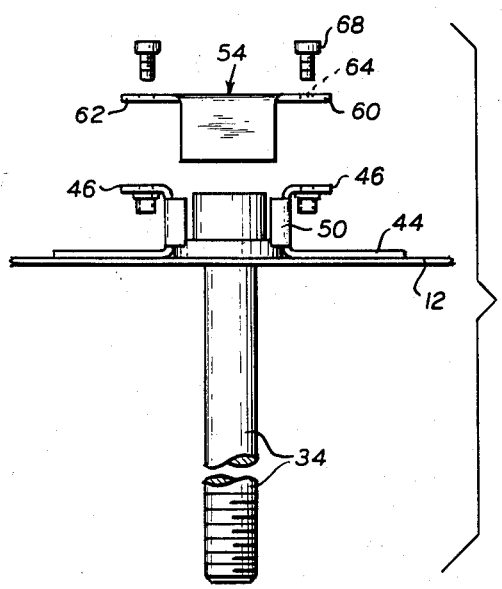
FIG. 3 is an enlarged side elevation of a retaining ring with bolt retaining means thereon constructed in accordance with the invention and with the cap portion of the retaining means indicated removed from the remaining portion.
Figure 4:
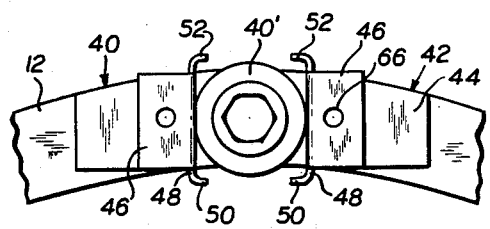
FIG. 4 is a top plan view of the retaining means indicated in FIG. 3 with the cap portion removed.
Figure 5:
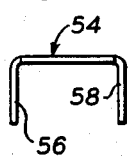
FIG. 5 is an end elevation of the cap portion of the retaining means.

After the ring 12 is positioned on the disk 20 to align the openings 36 with the openings formed on the disk 20, the bolt 34 is inserted through the openings to position head 40', as indicated in FIG. 2. Thereafter the cap element 54, which is of generally channel-shaped configuration, is positioned over the channel members 40 and 42 with leg portions 56 and 58 fitting on the interior of the inturned ends 50 and 52. Flange portions 60 and 62 are positioned over the flanges 46 and openings 64 are aligned with threaded bores 66 defined on the flanges 46. Bolt elements 68 are then positioned in the opening 64 and threaded into the bore 66 to hold the cap 54 tightly to the channel members 40 and 42 and to provide a secure retaining means for the bolt 34.

Thus, the invention provides means for improving the safety of aircraft and similar vehicles by providing a retaining ring for the bolts thereof. The retaining ring includes novel retaining means which include opposed substantially channel-shaped elements which define substantially opposed channel-shaped means for securing a bolt therebetween. The elements include top bases to receive a cap element which includes downturned leg portions which fit between the opposed channel members. The cap element is secured to the channel member such as by a threaded bolt member and provides with the channel member a means for securing the bolt and the head thereof against withdrawal from the ring.

While specific embodiments of the invention have been shown and described in detail to illustrate the application of the inventive principles, it will be understood that the invention may be embodied otherwise without departing from such principles.

I claim:

A device for retaining relatively large sized bolts and similar elements used in the mounting of a wheel having bolt openings in a flange to accommodate bolts which extend therethrough and are threaded into the threaded bores of a hub, comprising a ring of a size to fit over the annular area of the location of the bolt openings of the wheel flange and the threaded bores of the hub, said ring having a plurality of circumferentially spaced openings of a size to accommodate a bolt and located to align with the openings of said wheel flange and the bores of said hub, opposed first and second channel-shaped elements arranged on each side of each opening in said ring, each including a base flange portion secured to said ring and a portion extending outwardly from said ring by an amount commensurate with the height of the head of a bolt to be positioned in the opening, said opposed first and second channel-shaped elements terminating in a cap-receiving flange substantially parallel to the surface of said ring, a cap member covering the space between said first and second channel-shaped elements, said cap member including flanges extending outwardly from each side which are secured to respective cap-receiving flanges of said channel elements, said opposed channel-shaped elements and said cap member together being of a size to prevent escape of a respective bolt as well as the head of said bolt alone, said opposed channel-shaped members each having inturned ends which extend on each side of the bolt head positioned therebetween, said cap member including a substantially channel-shaped piece having downwardly extending leg portions which extend between said channel members interiorly of the inturned ends, and a cap-securing bolt extending through said cap member flanges and threaded to respective cap-receiving flanges of said channel member.

References Cited by the Examiner

UNITED STATES PATENTS

| 821,297 | 5/06 | Kohler | 151—41.71 |
| 2,409,907 | 10/46 | Shakesby et al. | 151—41.71 |
| 2,658,546 | 11/53 | Crowther | 151—41.76 |
| 2,780,264 | 2/57 | Aspey | 151—41.71 |

EDWARD C. ALLEN, *Primary Examiner.*